United States Patent
Guo et al.

(10) Patent No.: US 12,218,875 B2
(45) Date of Patent: Feb. 4, 2025

(54) APPARATUS AND METHOD OF CSI ACQUISITION ON SIDELINK

(71) Applicant: LENOVO (BEIJING) LIMITED, Beijing (CN)

(72) Inventors: Xin Guo, Beijing (CN); Xiaodong Yu, Beijing (CN); Zhennian Sun, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 324 days.

(21) Appl. No.: 17/637,272

(22) PCT Filed: Aug. 23, 2019

(86) PCT No.: PCT/CN2019/102303
§ 371 (c)(1),
(2) Date: Feb. 22, 2022

(87) PCT Pub. No.: WO2021/035410
PCT Pub. Date: Mar. 4, 2021

(65) Prior Publication Data
US 2022/0286255 A1   Sep. 8, 2022

(51) Int. Cl.
*H04L 5/00* (2006.01)

(52) U.S. Cl.
CPC .......... *H04L 5/0051* (2013.01); *H04L 5/0057* (2013.01); *H04L 5/006* (2013.01)

(58) Field of Classification Search
None
See application file for complete search history.

(56) References Cited

U.S. PATENT DOCUMENTS

2020/0322024 A1* 10/2020 Cheng ............... H04W 76/11
2020/0322032 A1* 10/2020 Xiang ............... H04B 7/088
(Continued)

FOREIGN PATENT DOCUMENTS

| CN | 109644455 A | 4/2019 |
|----|-------------|--------|
| CN | 109891772 A | 6/2019 |

(Continued)

OTHER PUBLICATIONS

Samsung, Considerations on Sidelink CSI, 3GPP TSG RAN WG1 #96, R1-1902279, Feb. 25-Mar. 1, 2019, pp. 1-6, Athens, Greece.
(Continued)

*Primary Examiner* — Otis L Thompson, Jr.
(74) *Attorney, Agent, or Firm* — Kunzler Bean & Adamson (57) ABSTRACT

Apparatus and methods of Channel Status Information (CSI) acquisition on sidelink are disclosed. The apparatus includes: a transmitter that transmits a reference signal to a device on a sidelink (SL) transmission; a receiver that receives a channel quality report from the device; and a processor that controls the transmitter and the receiver, and decodes the channel quality report to obtain a channel quality; wherein the processor is configurable to support one or a combination selected from a group consisting of: a reporting activation scheme where an SL Channel Status Information (CSI) reporting activation indicator is configured; and a measurement triggering scheme where the transmitter initiates transmission of the reference signal upon satisfying a triggering condition.

20 Claims, 5 Drawing Sheets

(56) References Cited

U.S. PATENT DOCUMENTS

| | | | | |
|---|---|---|---|---|
| 2021/0377989 A1* | 12/2021 | Chae | ............... | H04L 1/1861 |
| 2022/0085923 A1* | 3/2022 | Ye | ............... | H04L 1/1607 |
| 2022/0167192 A1* | 5/2022 | Lee | ............... | H04L 5/0053 |
| 2022/0286184 A1* | 9/2022 | Li | ............... | H04L 5/0051 |
| 2024/0064093 A1* | 2/2024 | Lin | ............... | H04W 28/0958 |

FOREIGN PATENT DOCUMENTS

| | | |
|---|---|---|
| WO | 2018175553 A1 | 9/2018 |
| WO | 2019097482 A1 | 5/2019 |
| WO | 2020146580 A1 | 7/2020 |
| WO | 2020146580 A8 | 7/2020 |
| WO | 2021030565 A1 | 2/2021 |

OTHER PUBLICATIONS

International Searching Authority, "Written Opinion of the International Searching Authority," PCT/CN2019/102303, May 8, 2020, pp. 1-4.

* cited by examiner

APPARATUS AND METHOD OF CSI ACQUISITION ON SIDELINK

FIELD

The subject matter disclosed herein relates generally to wireless communication and more particularly relates to, but not limited to, apparatus and methods of Channel Status Information (CSI) acquisition on sidelink (SL).

BACKGROUND

The following abbreviations and acronyms are herewith defined, at least some of which are referred to within the following description.

Third Generation Partnership Project (3GPP), 5th Generation (5G), New Radio (NR), 5G Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Hybrid Automatic Repeat Request (HARD), Acknowledgement (ACK), Hybrid Automatic Repeat Request Acknowledgement (HARQ-ACK), Negative Acknowledgement (NACK), Receive/Receiver (RX), Transmit/Transmitter (TX), Physical Sidelink Shared Channel (PSSCH), Physical Uplink Control Channel (PUCCH), Physical Uplink Shared Channel (PUSCH), Bandwidth Part (BWP), Control Element (CE), Channel State Information (CSI), Channel State Information Reference Signal (CSI-RS), Vehicle-to-Everything (V2X), Cellular V2X (C-V2X), Vehicle-to-Vehicle (V2V), Vehicle-to-Infrastructure (V2I), Vehicle-to-Network (V2N), Vehicle-to-Pedestrian (V2P), Vehicle-to-Device (V2D), Vehicle-to-Grid (V2G), Device to Device (D2D), Downlink Control Information (DCI), Demodulation Reference Signal (DMRS, DM-RS), Frequency Division Multiple Access (FDMA), Media Access Control (MAC), Proximity Service (ProSe), Quality of Service (QoS), Radio Resource Control (RRC), Reference Signal (RS), Reference Signal Received Power (RSRP), Sounding Reference Signal (SRS), Channel Quality Indicator (CQI), Layer 1 Reference Signal Received Power (L1-RSRP), Precoder Matrix Indicator (PMI), Rank Indicator (RI), Sidelink Control Information (SCI), Channel Busy Ratio (CBR), PC5 5G QoS Identifier (PQI). As used herein, "HARQ-ACK" may represent collectively the Positive Acknowledge (ACK) and the Negative Acknowledge (NACK). ACK means that a TB is correctly received while NACK means a TB is erroneously received.

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Vehicle-to-everything (V2X) communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X is the key technology of the future intelligent transportation system, and its application will enhance road safety and traffic efficiency, reducing congestion and energy consumption. There are two types of V2X communication technology depending on the underlying technology being used: WLAN-based and cellular-based.

V2X communication using wireless mobile networks is called cellular V2X (or C-V2X) to differentiate it from the WLAN-based V2X. 3GPP published V2X specifications based on LTE as the underlying technology in 2016 and has continued to expand the V2X functionalities to support fifth generation (5G) access networks, which can also be referred to as New Radio (NR) access networks.

SUMMARY

Apparatus and methods for Channel Status Information (CSI) acquisition on sidelink are disclosed.

According to a first aspect, there is provided an apparatus comprising: a transmitter that transmits a reference signal to a device on a sidelink (SL) transmission; a receiver that receives a channel quality report from the device; and a processor that controls the transmitter and the receiver, and decodes the channel quality report to obtain a channel quality; wherein the processor is configurable to support one or a combination selected from a group consisting of: a reporting activation scheme where an SL Channel Status Information (CSI) reporting activation indicator is configured; and a measurement triggering scheme where the transmitter initiates transmission of the reference signal upon satisfying a triggering condition.

According to a second aspect, there is provided an apparatus comprising: a receiver that receives a reference signal from a device on a sidelink (SL) transmission; a transmitter that transmits a channel quality report to the device; and a processor that controls the transmitter and the receiver, and measures a channel quality based on the reference signal received; wherein the processor is configurable to support one or a combination selected from a group consisting of: a reporting activation scheme where an SL Channel Status Information (CSI) reporting activation indicator is configured; and a measurement triggering scheme where the processor measures the channel quality upon satisfying a triggering condition.

According to a third aspect, there is provided a method comprising: transmitting, by a transmitter, a reference signal to a device on a sidelink (SL) transmission; receiving, by a receiver, a channel quality report from the device; and decoding, by a processor, the channel quality report to obtain a channel quality; wherein the processor controls the transmitter and the receiver, and is configurable to support one or a combination selected from a group consisting of: a reporting activation scheme where an SL Channel Status Information (CSI) reporting activation indicator is configured; and a measurement triggering scheme where the transmitter initiates transmission of the reference signal upon satisfying a triggering condition.

According to a fourth aspect, there is provided a method comprising: receiving, by a receiver, a reference signal from a device on a sidelink (SL) transmission; transmitting, by a transmitter, a channel quality report to the device; and measuring, by a processor, a channel quality based on the reference signal received; wherein the processor controls the transmitter and the receiver, and is configurable to support one or a combination selected from a group consisting of: a reporting activation scheme where an SL Channel Status Information (CSI) reporting activation indicator is configured; and a measurement triggering scheme where the processor measures the channel quality upon satisfying a triggering condition.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions or acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

Figure 1:
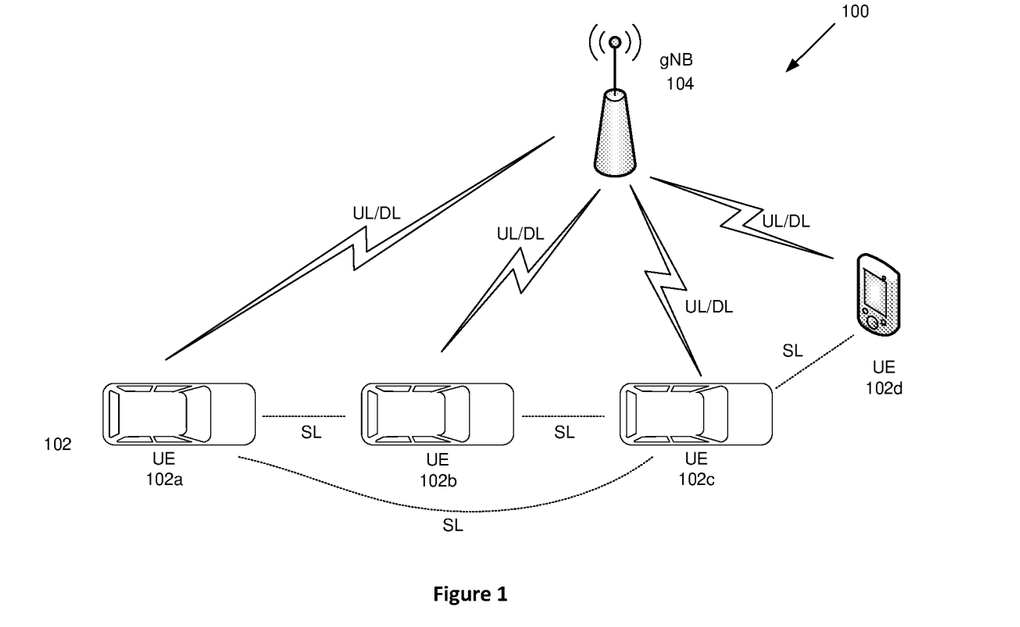
FIG. 1 is a schematic diagram illustrating a wireless communication system.

FIG. 1 is a schematic diagram illustrating a wireless communication system. It depicts an embodiment of a wireless communication system 100 with V2X sidelink communication. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the downlink (DL) and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102*a*, 102*b*, 102*c*, and 102*d*, which may be NR UL or DL communication links, for example. Some UEs 102 may simultaneously communicate with different Radio Access Technologies (RATs), such as NR and LTE.

Direct or indirect communication link between two or more NEs 104 may be provided.

In a V2X network, the UEs may be a vehicle or vehicle carried device 102a, 102b, 102c, or a pedestrian carried device 102d. Sidelink (SL) is a special kind of communication mechanism between UEs, or device to device (D2D), without going through a base station 104. In this case, the communication with a base station is not required, and proximity service (ProSe) is the feature that specifies the architecture of the direct communication between UEs. As part of ProSe service, a new D2D interface (designated as PC5, also known as sidelink at the physical layer) was introduced. Sidelink may refer to the direct communication between vehicle and other devices (e.g. V2V, V2I), and it uses PC5 interface. PC5 refers to a reference point where user equipment (UE), i.e., a mobile terminal, directly communicates with another UE over the direct channel.

Figure 2:
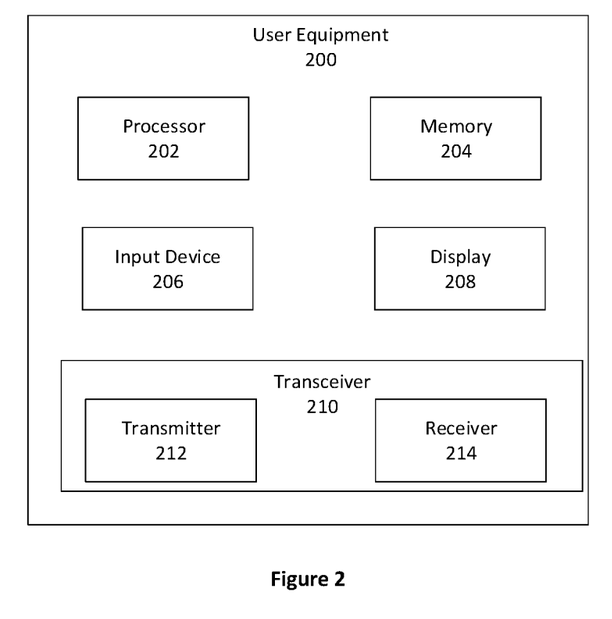
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

In some embodiments, the transmitter 212 may be used to transmit SL communication signals to another UE, whereas the receiver 214 may be used to receive SL communication signals from another UE.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
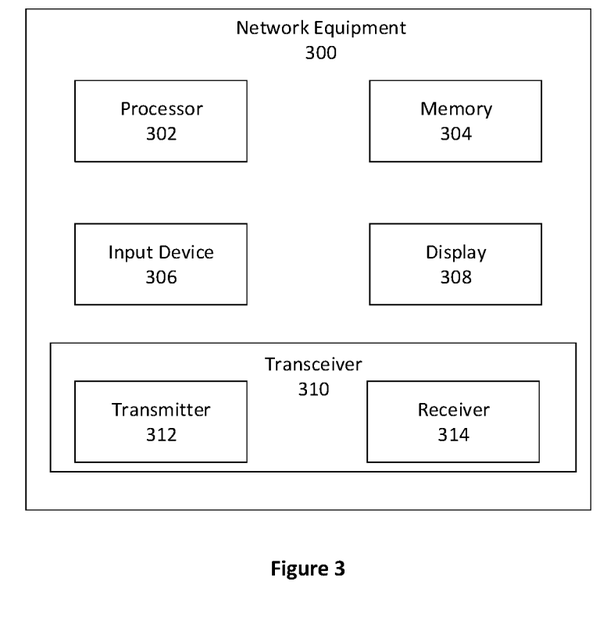
FIG. 3 is a schematic block diagram illustrating components of network equipment (NE) according to one embodiment.

FIG. 3 is a schematic block diagram illustrating components of network equipment (NE) 300 according to one embodiment.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. For example, the processor 302 may control the transceiver 310 to receive a PUCCH resource and/or a PUSCH resource. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

Channel characteristics measurement or estimation, namely channel sounding, is supported by NR in the context of Uu interface. Corresponding reference signals (RS) consist of downlink channel-state-information reference signals (CSI-RS) and uplink sounding reference signals (SRS). Regardless of detailed configurations, the SRS may be seen as the uplink equivalence to the downlink CSI-RS. For the sake of simplicity, the downlink CSI-RS is applied as an example to introduce the channel sounding design related issues below.

The concept of the CSI-RS was originally introduced in Long Term Evolution (LTE) Release 10 and is reused in NR. The measurement on CSI-RS and the corresponding reporting to the network should be explicitly configured to devices, i.e. the UEs. As per the 3GPP specifications, such a configuration is done by means of a report configuration, referred to as a CSI-ReportConfig. Each report configuration mainly indicates the following items.

Report Quantity:

The report could, for example, include different combinations of channel-quality indicator (CQI), rank indicator (RI), and precoder-matrix indicator (PMI). Alternatively, the configuration may indicate reporting of reference-signal received power (RSRP). In addition to higher-layer RSRP reporting, NR also supports L1-RSRP reporting.

Measurement Resource:

The report configuration also describes a set of downlink resources on which measurements should be carried out in order to derive the quantity or quantities to be reported. The resource configuration is associated with at least one NZP-CSI-RSResourceSet to be used for measuring channel characteristics.

A single-port CSI-RS occupies a single resource element. A multi-port CSI-RS can be seen as multiple orthogonally transmitted per-antenna-port CSI-RS sharing the overall resource set assigned for the configured multi-port CSI-RS. In general, an N-port CSI-RS occupies a total of N resource elements within one resource block in the frequency domain and one slot in the time domain.

A CSI-RS is configured for a given downlink bandwidth part (BWP) and using the numerology of the BWP. The CSI-RS can be configured to cover the full bandwidth of the BWP or just a fraction of the bandwidth. In the latter case, the CSI-RS bandwidth and frequency-domain starting position are provided as part of the CSI-RS configuration.

In the time domain, a CSI-RS resource set can be configured in a periodic, semi-persistent, or aperiodic manner. Periodic CSI-RS transmission occurs every $N_{th}$ slots for a device. In addition to the periodicity of N, the device is also configured with a specific slot offset for the CSI-RS transmission. For semi-persistent CSI-RS transmission, a certain CSI-RS periodicity and a corresponding slot offset are configured. However, the actual CSI-RS transmission can be activated or deactivated based on Media Access Control (MAC) Control Elements (CEs). For aperiodic CSI-RS, no periodicity is configured. Rather, a device is explicitly triggered for each CSI-RS transmission instance by means of DCI signaling.

Report Resource:

Similar to the CSI-RS transmission, the reporting can be periodic, semi-persistent, or aperiodic.

Periodic reporting is done with a certain configured periodicity and is always done on the Physical Uplink Control Channel (PUCCH). Thus, in the case of periodic reporting, the resource configuration also includes information about a periodically available PUCCH resource to be used for the reporting.

In the case of semi-persistent reporting, a device is configured with periodic reporting instances in the same way as for the periodic reporting. However, the actual reporting can be activated or deactivated by means of MAC CE. The semi-persistent reporting can be done on a periodically assigned PUCCH, or Physical Uplink Shared Channel (PUSCH). The PUSCH is typically used for larger reporting payloads.

Aperiodic reporting is explicitly triggered by means of DCI, more specifically within a CSI-request field within the uplink scheduling grant (DCI format 0-1). The aperiodic reporting is always done on the scheduled PUSCH and thus requires an uplink scheduling grant.

On 5G V2X, sidelink (SL) channel status information (CSI) should try to reuse the CSI framework for NR Uu. For SL communication, there may be several resource allocation mechanisms, including:

(1) mode-1, where the base station schedules sidelink resource(s) to be used by UEs for sidelink transmission (s);

(2) mode-2, where a UE determines (i.e. the base station does not schedule) the sidelink transmission resource (s);

(3) mode-3, where the resource for the SL transmission between a pair of the TX UE and the RX UE is determined by a further device, e.g. a third UE.

Taking the characteristics specific for sidelink into consideration, a number of issues are considered to guarantee the efficiency of the CSI framework for NR sidelink. These issues are dealt with in view of the different resource allocation mechanisms above.

The first issue is how to determine and indicate the measurement resource.

In the case of mode-2, where the UE determines sidelink transmission resource(s), it is straightforward for the TX UE to determine a sidelink CSI-RS resource set. Since the UE may not need to perform CSI measurement in every SL slots, the sidelink CSI-RS can be configured in an aperiodic manner, from the perspective of RS overhead efficiency. In this case, an indication of the presence of sidelink CSI-RS in the Physical Sidelink Shared Channel (PSSCH) resource is needed. Such an indication can be done by means of an additional field of one bit within the Sidelink Control Information (SCI).

In the case of mode-1, the above indication is also suitable with appropriate adaptations. In this case, the gNB may determine the measurement resource, which, in turn, is indicated from the gNB to the TX UE, and then from the TX UE to the RX UE. Alternatively, the measurement resource determined by the gNB may be indicated to the TX UE and the RX UE simultaneously.

The above indication may also be applied to the case of mode-3 with appropriate adaptations, e.g. by performing the functions of the gNB in mode-1 using a third UE.

The second issue is how to trigger the RX UE's SL CSI measurement and/or reporting.

In the case of mode-2, in a first option, to apply knowledge about the channel quality in determining transmission configuration, it is straightforward for the TX UE to trigger the RX UE's SL CSI measurement and/or reporting. The above additional field in the SCI indicating the presence of the CSI-RS in a PSSCH transmission can also be reused to trigger the RX UE's SL CSI measurement and/or reporting. If the SCI is not available, the CSI measurement and reporting may be triggered by the detection of CSI-RS within pre-configured resources of a PSSCH transmission. Alternatively, as a second option, the CSI measurement may be requested by the RX UE. Upon identifying a lower successful decoding ratio, for example, the RX UE may request the TX UE to reboot a SL CSI measurement and/or reporting cycle and thus re-determine transmission configuration.

In the case of mode-1, the above indication in the first option is also suitable with appropriate adaptations. The SL CSI measurement and/or reporting can be triggered by the gNB, which allocates resources for SL, via DL DCI signalling.

The above may also be applied to the case of mode-3 with appropriate adaptations, e.g. by performing the functions of the gNB in mode-1 using a third UE.

The third issue is how to determine and indicate the reporting resource.

In the case of mode-2, compared with the TX UE, the RX UE is more suitable to determine the reporting resources since the report transmission is performed by the RX UE. Additionally, determining resource locally by the RX UE can decrease the latency caused by resource indication. The SCI can be used to indicate whether the reporting is conveyed in a PSSCH transmission or not.

In the case of mode-1, the indication above is also suitable with appropriate adaptations. The gNB may determine the reporting resource. The reporting resource may be indicated from the gNB to the RX UE via the TX UE, or from the gNB to the RX UE directly. Furthermore, the report can be transmitted to at least one of the TX UE and the gNB.

The above may also be applied to the case of mode-3 with appropriate adaptations, e.g. by performing the functions of the gNB in mode-1 using a third UE.

In some embodiments, SL CSI measurement and/or reporting are triggered by the TX UE for the resource allocation mechanism mode-2.

A method for a sidelink CSI acquisition process, e.g. including measurement and reporting, triggered by the TX UE according to an embodiment of the present disclosure is described with reference to FIG. 4. In the embodiment, mode 2 resource allocation mechanism is used where the UEs determine sidelink transmission resources.

In step 402, the SL CSI measurement configuration is transmitted and configured to the RX UE 104b from the TX UE 104a. This configuration indicates information, such as the report quantity and the measurement resource. Such a configuration may be determined by the TX UE 104a and then sent to the RX UE 104b. The sending of the SL CSI measurement configuration may be done by means of sidelink Radio Resource Control (RRC) or SCI. Alternatively, such a configuration may also be pre-configured. When the SL CSI measurement configuration is configured by the TX UE, the TX UE may not need to send this for every instances of CSI measurement and/or reporting. In some embodiments, it may only send this SL CSI measurement configuration when the configuration changes.

The report quantity may include at least one of the following: Channel Quality Indicator (CQI), Rank Indicator (RI), Precoder Matrix Indicator (PMI), Reference Signal Received Power (RSRP), and etc.

In step 404, the TX UE triggers the SL CSI measurement and/or reporting of the RX UE. The trigger may be done, for example, by means of an additional field of one bit within the SCI, which indicates the presence of sidelink CSI-RS in a PSSCH transmission.

The TX UE 104a may transmit the SL CSI measurement trigger to the RX UE 104b upon satisfying a triggering condition. The triggering condition may include at least one of the following: a periodic timer, a Hybrid Automatic Repeat Request (HARM) feedback result, a change of mobility status, a service QoS, a service priority, and etc.

In some cases, when the TX UE has no data to transmit, the CSI-RS may be transmitted in a PSSCH with dummy data. In such case, an additional field in the SCI may be added to indicate the existence of the dummy data in the PSSCH that does not need decoding.

In step 406, the TX UE 104a transmits the SL CSI-RS to the RX UE 104b according to the SL CSI measurement configuration. The transmitter 212 of the TX UE 104a transmits a reference signal to the RX UE 104b on a sidelink (SL) transmission.

In some embodiments, the sidelink CSI measurement and/or reporting may be explicitly triggered. The transmission of the SL CSI-RS may have an offset X 410 in the time domain compared to the CSI measurement triggering instance. The SL CSI-RS timing offset X 410 refers to the time gap between the SL CSI measurement trigger transmission and the SL CSI-RS transmission. This offset X may be defined in terms of the number of SL slots or symbols, and may be conveyed in the SL CSI measurement configuration. Alternatively, the SL CSI-RS timing offset X may also be pre-configured.

In some embodiments, cross-slot scheduling may not be supported, that is, data transmission and the corresponding SCI indicating the resource for the data transmission have to occur in an identical SL slot. In this case, the value of the offset X is set to zero; and the offset X may be pre-configured.

In some other embodiments, cross-slot scheduling is supported. The time gap between the SCI and the corresponding data transmission may be configurable. The value of the offset X 410 may be set to a number not less than zero. In this case, the offset X 410 may be conveyed in the SL CSI measurement configuration.

If the sidelink CSI measurement and/or reporting are not explicitly triggered, the CSI measurement and/or reporting may be triggered by the detection of the CSI-RS within pre-configured resources of a PSSCH transmission.

In step 408, the RX UE reports the CSI measurement results (i.e. sends the SL CSI report and/or indicator) to the TX UE with a PSSCH transmission. To indicate the presence of such a report, SCI signaling can be used. The receiver 214 of the TX UE receives the channel quality report from the RX UE. The channel quality report may be decoded by the processor 202 of the TX UE to obtain a channel quality, i.e. the SL CSI is acquired.

In some cases, when the RX UE has no data to transmit, the CSI report may be sent in a PSSCH with dummy data. In such case, an additional field in the SCI sent to the TX UE may be added to indicate the existence of the dummy data in the PSSCH that does not need decoding.

An SL CSI reporting timing offset Y 412 may be specified. The offset Y 412 refers to a maximum time gap between the SL CSI measurement trigger and the valid CSI reporting instance. In other words, an SL CSI reporting may be assumed to be valid if and only if it is transmitted within the offset Y 412. The offset Y 412 may be defined in terms of the number of SL slots or symbols, and may be configured in the SL CSI measurement configuration, or pre-configured.

The offset Y 412 may be associated with at least one of the following factors: a frequency band, a band-with part (BWP), a resource pool, a Channel Busy Ratio (CBR), a UE capability, a resource selection window, a service Quality of Service (QoS), a priority level, and a spectrum efficiency.

The set of values of the offset Y 412 is configured and stored in a data base. For example, a list of the offset Y 412 values may be stored in a lookup table, and may be retrieved using an index key for the table. A specific value may be selected for a SL CSI measurement configuration.

In some embodiments, the CSI configuration and the CSI procedures including resource selection may be included in the 3GPP NR sidelink specifications.

For CSI configuration, an additional field within the CSI configuration may be added to indicate the configurable timing offset Y 412, which is the maximum time gap between the SL CSI measurement trigger and the valid CSI reporting instance.

For CSI procedures including resource selection, on the TX UE side, upon transmitting the SL CSI measurement trigger, the TX UE starts a timer corresponding to the offset Y. If the TX UE receives the corresponding CSI report from the RX UE before the timer expires, the TX UE stops the timer; otherwise, the TX UE restarts an SL CSI measurement cycle by transmitting a new SL CSI measurement trigger.

For CSI procedures including resource selection, on the RX UE side, upon receiving the SL CSI measurement trigger, the RX UE starts a timer corresponding to the offset Y. When the RX UE selects a resource based on sensing, it configures the resource selection window size based on existing policy and the offset Y 412. In general, the configured resource selection window size should not exceed the offset Y 412. Thus, if the RX UE can find an available resource before the timer expires or within the configured resource selection window, the RX UE reports the CSI accordingly; otherwise, the RX UE drops this CSI reporting.

FIG. 5 is a schematic diagram illustrating a sensing window and a resource selection window according to one embodiment. In an example, the relation between the offset Y 412 and the resource selection window 504 is as follows. The resource selection window 504 is defined as a time interval in which a UE selects sidelink resource(s) for transmission. The RX UE senses the CSI-RS in the sensing window 502 and selects a resource in the resource selection window 504 for transmission based on the sensing results. The value of the offset Y 412 may be used for the RX UE to determine the resource selection window bound. For example, the resource selection window 504 may start from slot $N+T_1$ and end at slot $N+T_2$; and thus having a resource selection window size of $\Delta T$ (i.e. $T_2-T_1$). The end bound of the resource selection window ($N+T_2$) should be no later than the end bound of the valid reporting instance (M+Y), where N denotes the starting point for resource selection, and M denotes the instance of the CSI measurement trigger.

The concept of the SL CSI reporting timing offset Y 412 may be considered as an activation or deactivation mechanism of the CSI reporting.

In some embodiments, the offset Y may also be referred to as a reporting activation indicator 412. Accordingly, the SL CSI measurement and/or reporting method may be referred to as a reporting activation scheme. An activation condition may refer to a condition that the time of the selected resource is within the offset Y, i.e. before the end of the valid reporting instance (M+Y), where M denotes the instance of the CSI measurement trigger; and a deactivation condition may refer to a condition that the time of the selected resource is beyond the offset Y, i.e. later than the valid reporting instance (M+Y), where M denotes the instance of the CSI measurement trigger. The channel quality report for the corresponding CSI-RS is expected to be received if the activation condition is satisfied, and is not expected be received if the deactivation condition is satisfied.

Alternatively, the activation or deactivation indicator may be defined as, for example, a priority level. Upon being configured, such priority level may be interpreted as the corresponding activation or deactivation indicator for both the TX UE and the RX UE.

When the SL CSI reporting conflicts with a data transmission to a third UE, i.e. other than the destination UE (the TX UE) of SL CSI reporting, the conflict needs to be dealt with. The RX UE needs to determine which one, i.e. the SL CSI reporting or the data transmission, should be performed. Thus, there should be some criteria for indicating priority levels for the SL CSI reporting and the data transmission. This may be done by means of configuring the SL CSI reporting with a priority level, as defined in PQI (PC5 5G QoS Identifier) for data transmission over sidelink.

The priority level for SL CSI reporting may be determined as follows. If the TX UE configures the PQI indicating a priority level for the pair of SL CSI-RS and SL CSI reporting explicitly, this priority level may be used as the priority level for the SL CSI reporting; otherwise, if the SL CSI-RS is transmitted together with data, the priority level for the data may be used as the priority level for the CSI reporting corresponding to the CSI-RS; otherwise, if the CSI reporting is transmitted together with data directed to the destination UE of the SL CSI reporting, i.e. the TX UE, the priority level for the data may be used as the priority level for the SL CSI reporting. More specifically, the data may be any data in a set of data satisfying the transmission condition for the SL CSI reporting, or the data may be data with the highest priority level within the set of data satisfying the transmission condition for the SL CSI reporting. In some embodiments, the highest priority level corresponds to the priority level with the lowest value. In some other embodiments, a pre-configured default priority level for CSI-RS is used.

In some embodiments, the SL CSI reporting is provided with more opportunities to find available resources. For example:

If $M+Y>=N+T_2$, i.e. the end bound of the resource selection window ($N+T_2$) is no later than the end bound of the valid reporting instance (M+Y), the sensing based resource selection policy for the SL CSI reporting may be identical to that of data transmission.

If $M+Y<N+T_2$, i.e. the end bound of the resource selection window ($N+T_2$) is later than the end bound of the valid reporting instance (M+Y), the length of resource selection window for the SL CSI reporting would be shorter than expected. To guarantee that the SL CSI reporting can find the available frequency resource within the shorter resource selection window, it needs to relax constrains on the resource selection for the SL CSI reporting as compared to that for the data transmission over sidelink. In sensing based resource selection, this can be done by means of increasing the energy threshold of sensing for the SL CSI reporting as compared to that for the data transmission. More specifically, if the energy threshold of sensing is defined as a fixed value, the fixed value for the CSI reporting should be higher than that of the data transmission. If the energy threshold of sensing is a range, the maximum threshold (i.e. the upper bound for energy threshold) for the CSI reporting should be higher than that of the data transmission. In that case, more frequency utilization opportunities can be found for the SL CSI reporting.

In some embodiments, the association between an SL CSI reporting and the corresponding CSI-RS is identified when multiple pairs of the CSI-RS and the CSI reporting exist for a given time duration.

The association can be done by means of an additional field within the SCI as an identity for each pair of the CSI-RS and the CSI reporting. Specifically, the TX UE can allocate an identity for a new CSI-RS and configure such an identity field in the SCI which indicates the presence of the CSI-RS in the associated PSSCH transmission. The RX UE receives and identifies such an identity, and configures this identity within the SCI indicating the presence of the CSI reporting to indicate to which CSI-RS the CSI reporting belongs.

Such an identity may be used to identify an initial transmission and a retransmission for each CSI-RS and the associated CSI reporting. Such an identity may also be used to identify transmissions for different pairs of the CSI-RS and the associated CSI reporting.

A maximum number of the pairs of the CSI-RS and the CSI reporting can be specified. This maximum number can be used to determine the length of the identity in terms of bits.

In some other embodiments, SL CSI measurement and/or reporting may be requested by the RX UE for the resource allocation mechanism mode-2.

A method for a sidelink CSI acquisition process, e.g. including measurement and/or reporting, triggered by the RX UE for mode-2 according to another embodiment of the present disclosure is described with reference to FIG. 6. In the embodiment, the SL CSI measurement and/or reporting is requested by the RX UE 104b. That is, the SL CSI measurement and/or reporting is triggered by a measurement request from the RX UE 104b.

In step 601, the RX UE 104b sends an SL CSI measurement request to the TX UE 104a to start an SL CSI measurement and/or reporting procedure. The request may be done by means of SCI.

Upon identifying a lower successful decoding ratio, for example, the RX UE 104b may request the TX UE 104a to restart an SL CSI measurement and/or reporting cycle, and re-determine the transmission configuration.

In some embodiments, the measurement request may be considered a trigger for the SL CSI measurement and/or reporting. Transmission of the measurement request by the RX UE, or reception of the measurement request by the TX UE, may be satisfaction of a triggering condition. Accordingly, the arrangement may also be referred to as a measurement triggering scheme where the transmitter initiates transmission of the reference signal upon satisfying the triggering condition. Other triggering condition may include a periodic timer, a Hybrid Automatic Repeat Request (HARQ) feedback result, a change of mobility status, a service QoS, a service priority, and etc.

In step 602, the sending of the SL CSI measurement configuration may be done by means of sidelink RRC or SCI. Alternatively, such a configuration may also be pre-configured. When the SL CSI measurement configuration is configured by the TX UE, the TX UE does not need to send this for every instance of the CSI measurement and/or reporting. It only have to send this when the configuration changes. The step 602 may be similar to the step 402 of the earlier method except that the step 602 is performed upon receiving an SL CSI measurement request from the RX UE.

In step 604, the TX UE 104a triggers the SL CSI measurement and/or reporting of the RX UE. The step 604 may be similar to the step 404 of the earlier method.

In step 606, the TX UE transmits the SL CSI-RS to the RX UE 104b according to the SL CSI measurement configuration. The step 606 may similar to the step 406 of the earlier method.

In step 608, the RX UE reports CSI measurement results to the TX UE with a PSSCH transmission. The step 608 may be similar to the step 408 of the earlier method.

Figure 4:
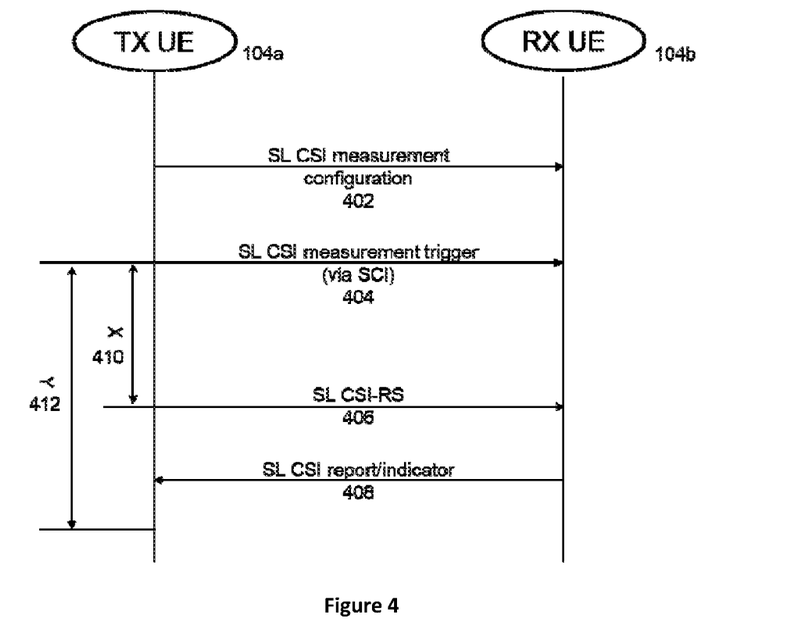
FIG. 4 is a schematic diagram illustrating a sidelink CSI acquisition process triggered by a TX UE according to one embodiment.
Figure 5:
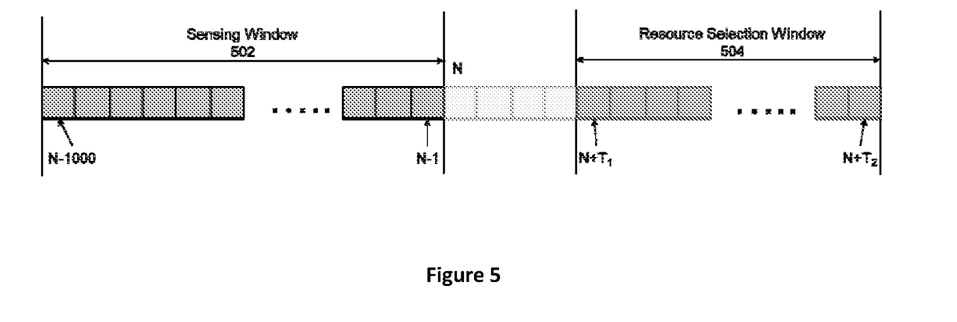
FIG. 5 is a schematic diagram illustrating a sensing window and a resource selection window according to one embodiment.

The SL CSI-RS timing offset X 610 may be provided in a similar manner as the SL CSI-RS timing offset X 410 of FIG. 4 of the earlier method.

Additionally or alternatively, an SL CSI reporting timing offset Y may also be defined and applied in this embodiment in a similar manner as the offset Y (the reporting activation indicator) 412 of FIG. 4 of the earlier method.

Figure 6:
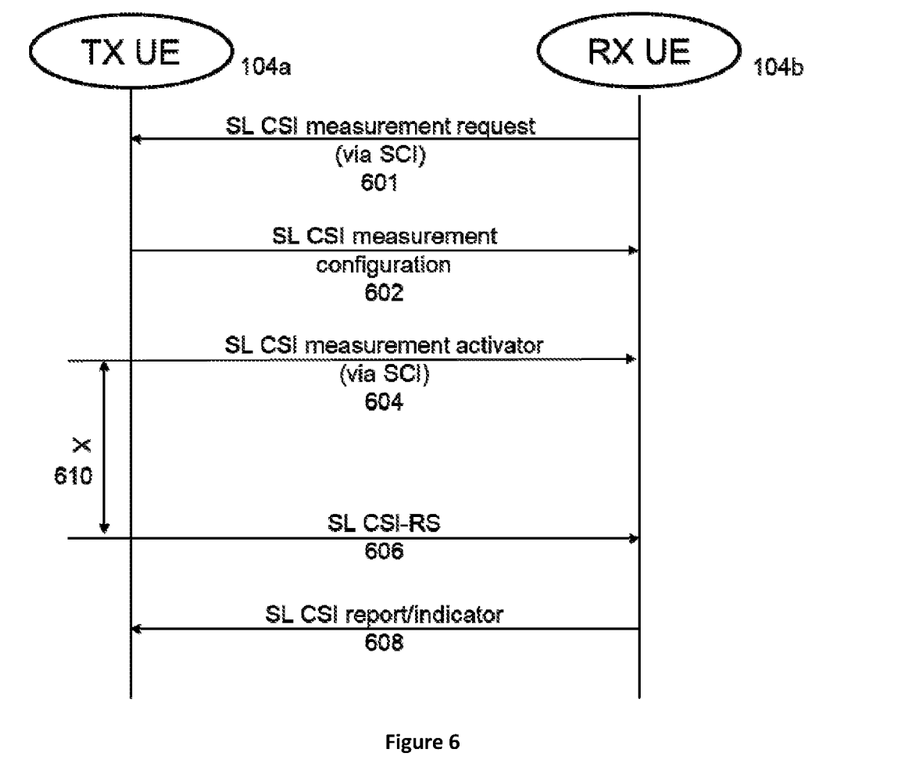
FIG. 6 is a schematic diagram illustrating a sidelink CSI acquisition process triggered by an RX UE according to one embodiment.

In some embodiments, sidelink CSI measurement and/or reporting are provided for the resource allocation mechanism mode-1, similar to the embodiments above as shown in FIGS. 4 to 6. Appropriate modifications and/or adaptations may be made. For example, the gNB may determine the reporting resource. The reporting resource may be indicated from the gNB to the RX UE via the TX UE, or from the gNB to the RX UE directly. Furthermore, the report can be transmitted to at least one of the TX UE and the gNB.

In some embodiments, sidelink CSI measurement and/or reporting are provided for the resource allocation mechanism mode-3, similar to the embodiments for mode-1 above. Appropriate modifications and/or adaptations may be made. For example, the functions of the gNB in mode-1 may be performed by using a further device, or a third UE.

In some embodiments, supporting of activation and/or deactivation of CSI reporting for SL is proposed. In the case of SL CSI acquisition, the reporting resource would be selected by the UE based on sensing. In some cases, if the reporting UE cannot find the available reporting resource timely, such CSI measurement results lose its efficiency in representing the channel property of the fast-changing sidelink. In this case, such a report should be avoided from the perspective of spectrum efficiency. For Uu interface, in contrast, there is no design of activation and/or deactivation of CSI reporting. The CSI reporting resource is deterministically allocated and indicted by the eNB/gNB to the UE. Therefore, there is no need to activate or deactivate CSI reporting for Uu CSI acquisition.

In some embodiments, a new trigger to renew an SL CSI measurement and/or reporting cycle is also proposed, supporting the CSI measurement triggered by the RX UE.

Since the RX UE has knowledge about the real-time transmission status of the SL, supporting of the CSI measurement triggered by the RX UE may be beneficial to achieve fast adaptation to the change of the SL channel. Upon identifying a lower successful decoding ratio, for example, the RX UE may request the TX UE to restart an SL CSI measurement and/or reporting cycle and re-determine transmission configuration.

Figure 7:
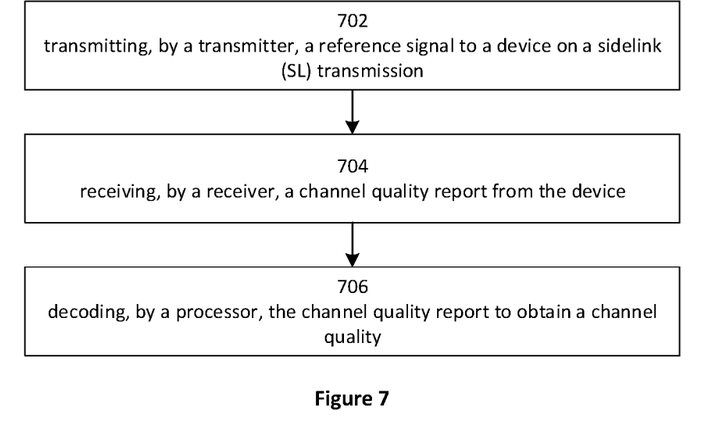
FIG. 7 is a flow chart illustrating steps of a sidelink CSI acquisition process for a TX UE according to one embodiment.

FIG. 7 is a flow chart illustrating steps of a sidelink CSI acquisition process for a TX UE.

At Step 702, the transmitter 212 on the TX UE side transmits a reference signal to a device on a sidelink (SL) transmission. The device here may refer to the RX UE which is in communication with the TX UE on SL transmissions.

At Step 704, the receiver 214 on the TX UE side receives a channel quality report from the device.

At Step 706, the processor 202 on the TX UE side decodes the channel quality report to obtain a channel quality.

The processor 202 controls the transmitter 212 and the receiver 214, and is configurable to support one or a combination selected from a group consisting of: a reporting activation scheme where an SL Channel Status Information (CSI) reporting activation indicator is configured; and a measurement triggering scheme where the transmitter initiates transmission of the reference signal upon satisfying a triggering condition.

Figure 8:
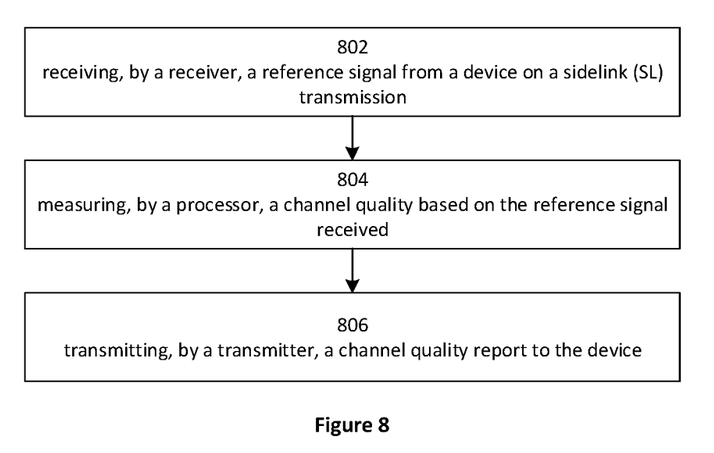
FIG. 8 is a flow chart illustrating steps of a sidelink CSI acquisition process for an RX UE according to one embodiment.

FIG. 8 is a flow chart illustrating steps of a sidelink CSI acquisition process for a RX UE.

At step 802, the receiver 214 on the RX UE side receives a reference signal from a device on a sidelink (SL) transmission. The device here may refer to the TX UE which is in communication with the RX UE on SL transmissions.

At step 804, the processor 202 on the RX UE side measures a channel quality based on the reference signal received.

At Step 806, the transmitter 212 on the RX UE side transmits a channel quality report to the device.

The processor 202 controls the transmitter 212 and the receiver 214, and is configurable to support one or a combination selected from a group consisting of: a reporting activation scheme where an SL Channel Status Information (CSI) reporting activation indicator is configured; and a measurement triggering scheme where the processor measures the channel quality upon satisfying a triggering condition.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
transmit a reference signal to a device on a sidelink (SL) transmission;
receive a channel quality report from the device; and
decode the channel quality report to obtain a channel quality;
wherein the at least one processor is configured to cause the UE to be configurable to support:
a reporting activation scheme in which a SL channel status information (CSI) reporting activation indicator is configured; and
a measurement triggering scheme that initiates transmission of the reference signal upon satisfying a triggering condition, wherein the triggering condition comprises a flag in sidelink control information (SCI).

2. The UE according to claim 1, wherein, in response to the reporting activation scheme being supported, the channel quality report is expected by the receiver upon satisfying an activation condition, and is not expected by the receiver upon satisfying a deactivation condition.

3. The UE according to claim 2, wherein the SL CSI reporting activation indicator is pre-configured, or the at least one processor is configured to cause the UE to transmit a channel quality measurement configuration, and the SL CSI reporting activation indicator is configurable via the channel quality measurement configuration.

4. The UE according to claim 2, wherein the SL CSI reporting activation indicator is a maximum time gap between a channel quality measurement trigger and a CSI reporting instance.

5. The UE according to claim 4, wherein the SL CSI reporting activation indicator is defined in terms of a number of SL slots or symbols.

6. The UE according to claim 4, wherein the at least one processor is configured to cause the UE to transmit a SL CSI measurement trigger, and upon transmitting the SL CSI measurement trigger, the processor starts a timer corresponding to the maximum time gap.

7. The UE according to claim 2, wherein the channel quality report comprises a report quantity comprising: a channel quality indicator (CQI), a rank indicator (RI), a precoder matrix indicator (PMI), a reference signal received power (RSRP), or some combination thereof.

8. The UE according to claim 1, wherein time and frequency resources for transmitting the reference signal are allocated by: a base station, the UE, a further device, or some combination thereof.

9. The UE according to claim 1, wherein, in response to having no data to transmit, the reference signal is transmitted in a physical sidelink shared channel (PSSCH) with dummy data.

10. A user equipment (UE), comprising:
at least one memory; and
at least one processor coupled with the at least one memory and configured to cause the UE to:
receive a reference signal from a device on a sidelink (SL) transmission;
transmit a channel quality report to the device; and
measure a channel quality based on the reference signal received;
wherein the at least one processor is configured to cause the UE to be configurable to support:
a reporting activation scheme in which a SL channel status information (CSI) reporting activation indicator is configured; and
a measurement triggering scheme in which the processor measures the channel quality upon satisfying a triggering condition, wherein the triggering condition comprises a flag in sidelink control information (SCI).

11. The UE according to claim 10, wherein, in response to the reporting activation scheme being supported, the at least one processor is configured to cause the UE to transmit the channel quality report upon satisfying an activation condition, and does not transmit the channel quality report upon satisfying a deactivation condition.

12. The UE according to claim 11, wherein:
the SL CSI reporting activation indicator is pre-configured or, if the receiver further receives a channel quality measurement configuration, configurable via the channel quality measurement configuration;
the SL CSI reporting activation indicator is a maximum time gap between a channel quality measurement trigger and a CSI reporting instance;
or a combination thereof.

13. The UE apparatus according to claim 12, wherein the SL CSI reporting activation indicator is defined in terms of a number of SL slots or symbols.

14. The UE according to claim 12, wherein the receiver further receives a SL CSI measurement trigger, and upon receiving the SL CSI measurement trigger, the processor starts a timer corresponding to the maximum time gap.

15. The UE according to claim 11, wherein the channel quality report comprises a report quantity comprising: a channel quality indicator (CQI), a rank indicator (RI), a precoder matrix indicator (PMI), a reference signal received power (RSRP), or some combination thereof.

16. The UE according to claim 10, wherein time and frequency resources for transmitting the channel quality report are allocated by: a base station, the UE, a further device, or some combination thereof.

17. The UE according to claim 10, wherein, if the measurement triggering scheme is supported, the triggering condition is satisfied on detection of the reference signal within a physical sidelink shared channel (PSSCH) transmission, or the triggering condition is satisfied on detection of a flag in SCI.

18. A method performed by a user equipment (UE), the method comprising:
transmitting a reference signal to a device on a sidelink (SL) transmission;
receiving a channel quality report from the device;
decoding the channel quality report to obtain a channel quality; and
supporting:
a reporting activation scheme in which a SL channel status information (CSI) reporting activation indicator is configured; and
a measurement triggering scheme that initiates transmission of the reference signal upon satisfying a triggering condition, wherein the triggering condition comprises a flag in sidelink control information (SCI).

19. The method according to claim 18, wherein, in response to the reporting activation scheme being supported, the channel quality report is expected upon satisfying an activation condition, and is not expected upon satisfying a deactivation condition.

20. The method according to claim 19, wherein the SL CSI reporting activation indicator is a maximum time gap between a channel quality measurement trigger and a CSI reporting instance.

\* \* \* \* \*